United States Patent
Bharali

[15] 3,654,441

[45] Apr. 4, 1972

[54] FOUR-PHASE HIGH SPEED COUNTER

[72] Inventor: Uipalananda Bharali, Raritan, N.J.

[73] Assignee: RCA Corporation

[22] Filed: Nov. 16, 1970

[21] Appl. No.: 89,600

[52] U.S. Cl. ........................235/92 LG, 307/279, 235/92 R, 235/92 GT, 235/92 EV, 307/222, 235/92 Q

[51] Int. Cl. ....................................G06m 1/14, H03k 23/08

[58] Field of Search ............235/92 EV, 92 Q, 92 PS, 92 GD, 235/92 CC, 92 GT, 92 LG; 307/222, 279

[56] References Cited

UNITED STATES PATENTS

| | | | |
|---|---|---|---|
| 3,422,254 | 1/1969 | Lundin | 235/92 GT |
| 3,121,787 | 2/1964 | Bordelon | 235/92 LG |

*Primary Examiner*—Thomas A. Robinson
*Assistant Examiner*—Joseph M. Thesz, Jr.
*Attorney*—H. Christoffersen

[57] ABSTRACT

In response to each pulse to be counted, the bit stored in each stage of the counter is sensed. In the case of up-counting, when the $j$ least significant bits are 1 and the $j+1^{th}$ least significant bit is a 0, the stages storing these $j+1$ bits are caused concurrently to change state, and where $j$ is any integer which is less than $n$, and $n$ is the number of stages in the counter. In the case of down-counting, the same procedure is followed for the complementary case. The counter may be implemented with metal oxide semiconductor (MOS) field-effect transistors.

5 Claims, 7 Drawing Figures

Inventor:
UTPALANANDA BHARALI
By [signature]
Attorney

Inventor:
UTPALANANDA BHARALI
BY Samuel Cohen
Attorney

Inventor:
UTPALANANDA BHARALI
BY Samuel Cohen
Attorney

| 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | IU | ID | Q | $\bar{Q}$ | R | S | | ROW |
|---|---|---|---|---|---|---|---|---|---|---|---|---|---|---|---|---|---|---|---|---|---|---|---|---|---|---|---|---|---|---|---|---|---|---|---|
| | | | | | # | | | | | | # | # | # | # | | | | # | | | # | | | # | # | | # | 1 | 1 | 1 | 1 | 1 | 1 | $\phi_1$ | 1 |
| | | | # | # | # | | | | | | # | # | # | | # | | | | | | | | | # | # | | # | 1 | 1 | 0 | 1 | 1 | 1 | $\phi_2$ | 2 |
| # | | # | | | # | # | | # | | | # | # | # | | | # | | | | | | # | | # | # | # | # | 1 | 1 | 0 | 1 | 1 | 1 | $\phi_3$ | 3 |
| | # | | | | # | | # | | # | # | # | # | # | | | | | | | # | | | # | # | # | | # | 1 | 1 | 0 | 1 | 1 | 1 | $\phi_4$ | 4 |
| | | | | | # | | | | | | # | # | # | # | | | | # | | | # | | | # | # | | # | 1 | 1 | 1 | 1 | 1 | 1 | $\phi_1$ | 5 |
| | | | # | # | # | | | | | | # | # | # | | # | | | | # | | | | | # | # | | # | 1 | 1 | 0 | 1 | 1 | 1 | $\phi_2$ | 6 |
| | | # | | | # | # | | # | | | # | # | # | | | # | | | | | | # | | # | | # | # | 0 | 1 | 0 | 1 | 1 | 1 | $\phi_3$ | 7 |
| | # | | | | # | | # | | # | # | # | # | | | | | | | | # | | | # | # | | | # | 0 | 1 | 0 | 1 | 0 | 1 | $\phi_4$ | 8 |
| | | | | | # | | | | | | # | # | | # | | | | # | | # | # | | | # | | | # | 0 | 1 | 1 | 1 | 0 | 1 | $\phi_1$ | 9 |
| | | | # | # | | | | | | | # | # | | | # | | | | # | # | | | | # | # | | | 0 | 1 | 1 | 0 | 0 | 1 | $\phi_2$ | 10 |
| # | | # | # | | | # | | # | | | # | # | | | | # | | | | # | | # | | | # | # | | 1 | 0 | 1 | 0 | 1 | 1 | $\phi_3$ | 11 |
| | # | | # | | | | # | | # | # | | | # | | | # | | | | # | | | # | | # | | | 1 | 0 | 1 | 0 | 1 | 0 | $\phi_4$ | 12 |
| | | | # | | # | | | | | | | | # | # | | # | | # | | | # | | | | # | | # | 1 | 0 | 1 | 0 | 1 | 0 | $\phi_1$ | 13 |
| | | | # | # | # | | | | | | | | # | | # | # | | | # | | | | | # | # | | # | 1 | 0 | 0 | 1 | 1 | 0 | $\phi_2$ | 14 |
| # | | # | | | # | # | | # | | | # | # | # | | | # | | | | | | # | | # | # | # | # | 1 | 1 | 0 | 1 | 1 | 1 | $\phi_3$ | 15 |
| | # | | | | # | | # | | # | # | # | # | # | | | | | | | # | | | # | # | # | | # | 1 | 1 | 0 | 1 | 1 | 1 | $\phi_4$ | 16 |
| | | | | | # | | | | | | # | # | # | # | | | | # | | | # | | | # | # | | # | 1 | 1 | 1 | 1 | 1 | 1 | $\phi_1$ | 17 |
| | | | # | # | # | | | | | | # | # | # | | # | | | | | | | | | # | # | | # | 1 | 1 | 0 | 1 | 1 | 1 | $\phi_2$ | 18 |
| # | | # | | | # | # | | # | | | # | # | # | | | # | | | | | | # | | # | # | # | # | 1 | 1 | 0 | 1 | 1 | 1 | $\phi_3$ | 19 |
| | # | | | | # | | # | | # | # | # | # | # | | | | | | | # | | | # | # | # | | # | 1 | 1 | 0 | 1 | 1 | 1 | $\phi_4$ | 20 |

$\phi_1$ = PERIOD DURING WHICH CLOCK $\phi_1$ REPRESENTS BINARY 1(-V)
1=-V
0=GROUND
#=DEVICE ON
BLANK=DEVICE OFF

Fig. 6.

Inventor:
UTPALANANDA BHARALI
By Samuel Cohen
Attorney

| 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 | 75 | 76 | 77 | 78 | | IN | SI | ROW |
|---|---|---|---|---|---|---|---|---|---|---|---|---|---|---|---|---|---|---|---|---|---|---|---|---|---|---|---|---|---|---|---|---|
| # | | | # | | | | | | | # | | # | | # | # | # | | | # | # | | # | # | | | # | | | $\phi_1$ | 0 | 1 | 1 |
| | # | | | | | | | | | # | | | # | # | | | # | | | # | # | | # | | | | | # | $\phi_2$ | 0 | 1 | 2 |
| | | | | # | | | # | # | | # | # | | | # | | | | # | | # | | | # | # | | | # | | $\phi_3$ | 0 | 1 | 3 |
| | | | | | # | | | | # | # | | | | # | | | | | | # | | | # | | # | | | | $\phi_4$ | 0 | 1 | 4 |
| # | | # | # | | | # | | | | # | | # | | # | # | # | | | # | # | | # | # | | | # | | | $\phi_1$ | 1 | 1 | 5 |
| | # | # | | | | # | | | | | | | # | # | | | # | | | # | # | | | | | | | # | $\phi_2$ | 1 | 1 | 6 |
| | | | | # | | | # | # | | | # | | | # | | | | # | | # | | | | # | | | # | # | $\phi_3$ | 0 | 1 | 7 |
| | | | | | # | | | | # | | | | | # | | | | # | | # | | | | | # | | | # | $\phi_4$ | 0 | 0 | 8 |
| # | | | # | | | | | | | # | | # | | # | # | # | | # | # | # | | # | # | | | # | | # | $\phi_1$ | 0 | 0 | 9 |
| | # | | | | | | | | | # | | | # | # | | | # | # | | # | # | | # | | | | | # | $\phi_2$ | 0 | 0 | 10 |
| | | # | | # | | # | # | # | | # | # | | | # | | | | # | | # | | | # | # | | | # | | $\phi_3$ | 1 | 1 | 11 |
| | | # | | | # | # | | | # | # | | | | | | | | | | | | | # | | # | | | | $\phi_4$ | 1 | 1 | 12 |
| # | | # | # | | | # | | | | # | | # | | | # | # | | | # | | | # | # | | | # | | | $\phi_1$ | 1 | 1 | 13 |
| | # | # | | | | # | | | | | | | # | | | | # | | | | # | # | | | | # | | # | $\phi_2$ | 1 | 1 | 14 |
| | | # | | # | | # | # | # | | | # | | | # | | | | # | | # | | # | | # | | # | # | | $\phi_3$ | 1 | 1 | 15 |
| | | # | | | # | # | | | # | | | | | | | | | # | | | | # | | | # | # | | | $\phi_4$ | 1 | 0 | 16 |
| # | | | # | | | | | | | # | | # | | | # | # | | # | # | | | # | # | | | # | | | $\phi_1$ | 0 | 0 | 17 |
| | # | | | | | | | | | # | | | # | | | | # | # | | | # | # | # | | | | | # | $\phi_2$ | 0 | 0 | 18 |
| | | | | # | | | # | # | | # | # | | | # | | | | # | | # | | # | # | # | | | # | | $\phi_3$ | 0 | 1 | 19 |
| | | | | | # | | | | # | # | | | | # | | | | | | # | | # | # | | # | | | | $\phi_4$ | 0 | 1 | 20 |
| # | | | # | | | | | | | # | | # | | # | # | # | | | # | # | | # | # | | | # | | | $\phi_1$ | 0 | 1 | 21 |
| | # | | | | | | | | | # | | | # | # | | | # | | | # | # | | # | | | | | # | $\phi_2$ | 0 | 1 | 22 |
| | | | | # | | | # | # | | # | # | | | # | | | | # | | # | | | # | # | | | # | | $\phi_3$ | 0 | 1 | 23 |

$\phi_1$ = PERIOD DURING WHICH CLOCK $\phi_1$ REPRESENTS BINARY 1(V)
1 = -V, 0 = GROUND
# = DEVICE ON
BLANK = DEVICE OFF

Fig. 7.

Inventor:
UTPALANANDA BHARALI
BY Samuel Cohen
Attorney

FOUR-PHASE HIGH SPEED COUNTER

BACKGROUND OF THE INVENTION

There are two commonly employed classes of electronic counters, namely those of the "serial ripple" type and those of the "parallel" type. A serial ripple counter operates relatively slowly. In response to an input pulse indicative of a binary digit to be counted, the counter stages react one after another and the count is registered only after the last stage has reacted. Thus, the speed of the counter is proportional to the number of its stages. The parallel counter, on the other hand, is fast but the number of electronic devices (transistors or the like) required rapidly increases as the number of stages is increased.

One purpose of the present invention is to provide a counter which operates at a speed comparable to that of a parallel counter but which employs a number of devices comparable to that of a serial ripple counter.

SUMMARY OF THE INVENTION

Each stage of a counter includes an input terminal and an output terminal. When an input terminal is at a first voltage level, its stage is caused to change state and when it is at a second voltage level, its stage remains in the same state. There is a switch associated with each such stage except the last stage which connects the input terminal of its stage to the input terminal of the following stage. Each switch is closed in response to a bit of one value stored by its stage and opened in response to a bit of other value stored by its stage. During a first interval of time, each input terminal is charged to said second voltage level. During a following interval of time, the input terminal of the first stage of the counter is placed at said first voltage level.

BRIEF DESCRIPTION OF THE DRAWING

FIG. 6 is a chart which explains the operation of the circuit of FIG. 2; and

FIG. 7 is a chart which explains the operation of the circuit of FIG. 4.

DETAILED DESCRIPTION

In the discussion which follows, the binary digit (bit) 1 is represented by a voltage $-V$; the bit 0 is represented by ground level. In some cases, rather than referring to a signal which represents a bit, the bit itself is referred to.

Figure 3:
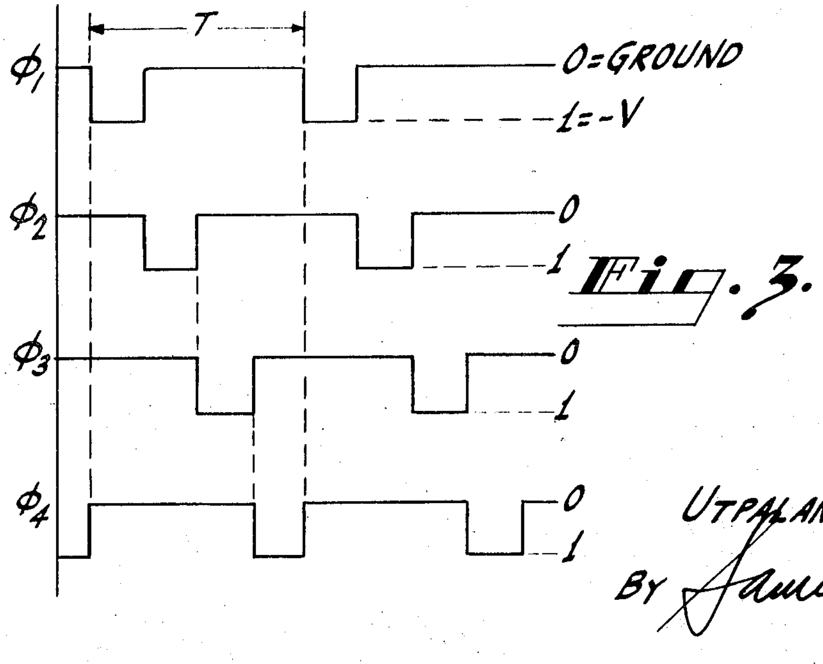
FIG. 3 is a drawing of waveforms for the four-phase clock signals employed in the circuit of FIG. 1.

The circuits illustrated are driven by four nonoverlapping clock signals $\phi_1$, $\phi_2$, $\phi_3$ and $\phi_4$ as shown in FIG. 3. In the discussion which follows, when the $\phi_i$ (or phase $i$) time or period is referred to, what is meant is the time interval during which the negative pulse of amplitude $-V$ is present.

In the embodiment of the invention illustrated, P-MOS enhancement type field-effect devices are employed. It is to be understood that this is merely illustrative as the invention can be practiced with $n$ type MOS devices or with other suitable devices. The circuit may be an integrated circuit and the entire counter may be on a common substrate (a single "chip").

Figure 1:
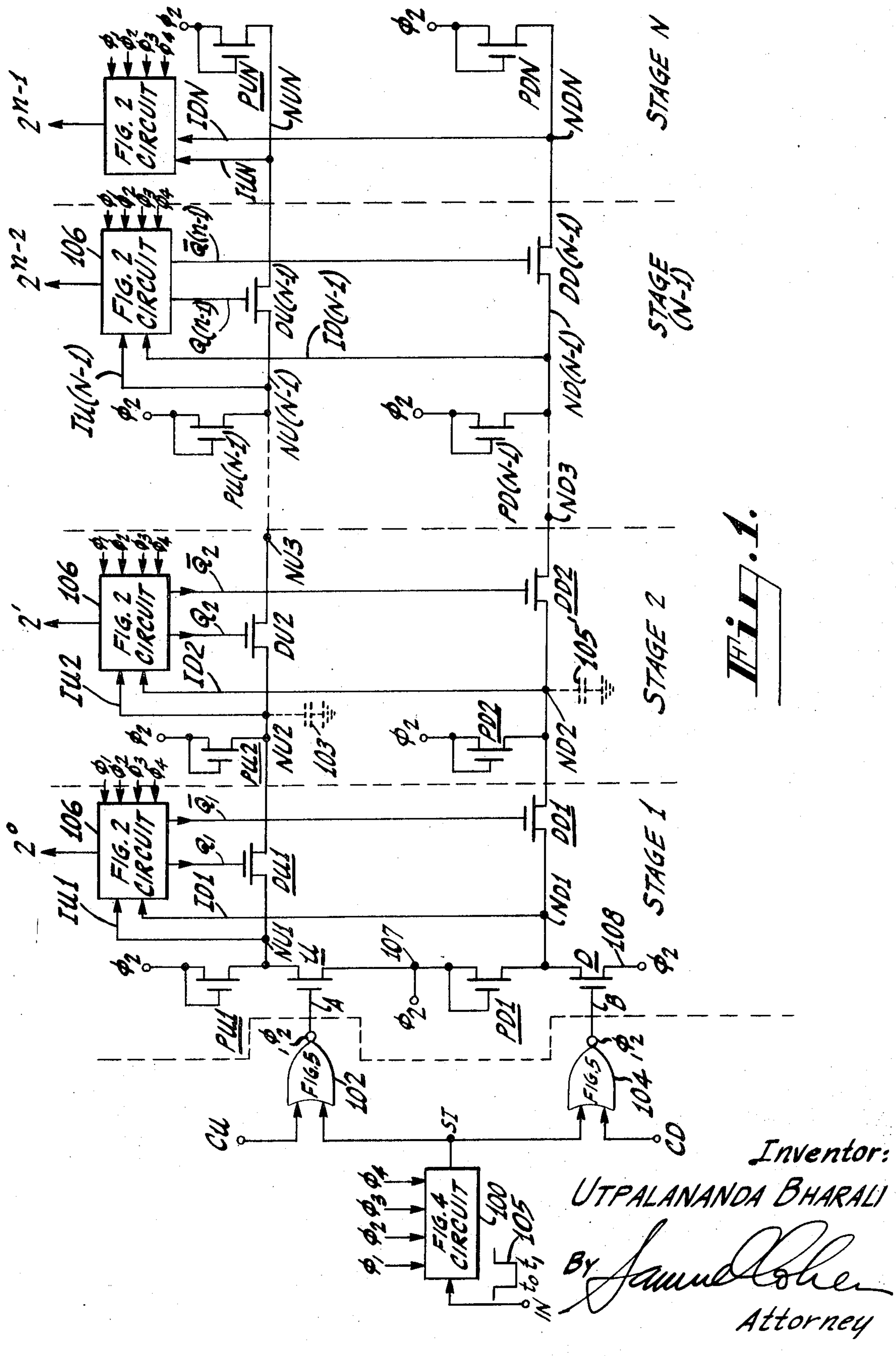
FIG. 1 is a block and schematic circuit diagram of an $n$ stage counter of a preferred embodiment of the invention.

In the counter of FIG. 1, stage 1 stores the least significant or $2^0$ bit, stage 2 the $2^1$ bit and so on, stage N storing the most significant, that 15, the $2^{n-1}$ bit. As will be shown shortly, when, during a certain phase time, the two inputs IU and ID to a counter stage are 1, 1, the stage does not change state; when the two inputs are 1, 0 or 0, 1 the counter stage changes state; the inputs 0, 0 never occur and are not permitted. The inputs CU and CD are complementary. When CU (count up) = 0 and CD (count down) = 1, the counter operates as an up counter; when CU=1, CD=0, the counter operates as a down counter.

The circuit of FIG. 1 includes input circuit 100, two NOR gates 102 and 104 and N counter stages legended "stage 1" through "stage N." To simplify the drawing, only four of these N stages are shown. The pulses to be counted, such as 105, are applied to the input terminal IN. These pulses are negative-going and of amplitude $-V$.

The input circuit 100 translates each input pulse to a signal SI=0. This SI=0 signal is stored in stage 100 during the phase 1 and phase 2 times and is translated by one of gates 102 and 104 into a signal A or B during the following phase 2 time. The symbol $_1\phi_2$ means that the NOR gates are "made ready" (precharged) during the $\phi_1$ time and that the information 1 or 0 produced is transferred into the circuit during the $\phi_2$ time. This information is stored at the NOR gate output nodes during $\phi_3$ and $\phi_4$ times. The NOR gates and circuit 100 are illustrated in more detail in FIGS. 5 and 4 respectively and their operation is discussed at greater length later.

The various stages 2 through $n-1$ of the counter are identical. Taking stage 2 as an example, each such stage includes a FIG. 2 circuit 106 which receives as inputs the signals IU2 and ID2. The signal IU2 comes from circuit node NU2 and the signal ID2 comes from circuit node ND2. The circuit 106 produces two outputs $Q_2$ and $\overline{Q}_2$ which, during the $\phi_2$ pulse (and also during the $\phi_3$ and $\phi_4$ pulses) are complementary. The $Q_2$ signal is applied to the gate electrode of MOS device DU2 and the $\overline{Q}_2$ signal is applied to the gate electrode of MOS device DD2. The circuit 106 also produces an output $2^{i-1}$, where $i$ is the number of the stage. For example, the second stage produces the second least significant bit $2^1$. During $\phi_2$ time, $2^i = Q_i$.

Each stage also includes two precharging transistors such as PU2 and PD2. Each is connected gate-to-drain and during $\phi_2$ time each operates as a resistor. Device PU2 charges the distributed capacitance present at node NU2 during $\phi_2$ time and device PD2 charges the distributed capacitance present at node ND2 during $\phi_2$ time. Such distributed capacitance is present at all of the nodes such as NU1...NUN, ND1...NDN and elsewhere; however, to avoid cluttering up the drawing, it is shown only at 103 and 105.

The first stage includes all of the elements described above for stages 2 to N−1 and, in addition, includes two additional MOS devices U and D. Device U is connected at its gate electrode to NOR gate 102; device D is connected at its gate electrode to NOR gate 104. The second electrode of device U is connected to the common gate-drain connection of device PD1 and to a terminal 107 to which the phase 2 pulse $\phi_2$ is applied. The second electrode of device D is connected to circuit node ND1 and to the third electrode of device PD1. The third electrode of device D is connected to a terminal 108 to which the phase 2 pulse is applied. The third electrode of device U is connected to the third electrode of device PU1 and to circuit node NU1.

The last stage, stage $n$ of the counter is the same as the second through the N−1 stages except that it does not include coupling transistors such as DU and DD and since it does not have such transistors the outputs $Q_n$ and $\overline{Q}_n$ are not needed and therefore, are not shown.

In the operation of the circuit of FIG. 1, assume that the counter initially is reset, that is, is storing all 0's. In this condition, all Q's=0 and all $\overline{Q}$'s=1 at phase 2, 3 and 4 times. Assume also that it is desired to count up, that is, that CU=0 and CD=1. The CU=0 primes NOR gate 102 whereas the CD=1 disables NOR gate 104. Assume now that some time during the period T (FIG. 3) of any one of the clock pulses, the signal IN changes from 0 to 1 and remains at the value 1 for an interval of at least T/2. With a pulse of this duration, it does not matter where within the period T this pulse occurs. In response to the IN=1 pulse, the circuit 100 produces an output SI=0 which it stores from the $\phi_4$ pulse period through the following $\phi_2$ pulse period.

The CU=0 and SI=0 signals enable NOR gate 102. During the $\phi_2$ pulse period, a 1 (−V volts) appears at A and remains at A through the $\phi_3$ and $\phi 4$ periods regardless of changes in SI during these $\phi_3$ *and* $\phi_4$ periods. (Note that devices 80 and 81 (FIG. 5) are off during the $\phi_3$ and $\phi_4$ times).

In response to the $\phi_2$ pulse, all of the precharging transistors PU1, PU2 and so on, and PD1, PD2 and so on, conduct and charge the circuit nodes NU1, NU2 and so on, and ND1, ND2 and so on, to −V. While transistor U is forward biased, it does not conduct since its source and drain electrodes are both at −V.

During the next clock pulse $\phi\phi_3$, terminal 107 returns to ground. As A is at −V (representing binary 1) at this time, transistor U conducts and node NU1 is pulled up from −V to ground, conduction occurring from NU1 through the drain-to-source path of transistor U to terminal 107 which is at ground. During this same interval, $Q_1$ is 0 (is at ground potential) so that transistor DU1 does not conduct. During this same interval, B, the output of NOR gate 104, is at 0 (ground) so that transistor D does not conduct and node ND1 remains charged to −V (binary 1).

The input to circuit 106 of stage 1 is now, that is, during the phase 3 time, NU1=0, ND1=1. In response to this input, the circuit 106 of stage 1 changes state, that is, $Q_1$ changes to 1 and $\bar{Q}$ changes to 0. This occurs during the following $\phi_2$ time, as will be shown shortly in the discussion of FIG. 2.

Summarizing the above, if the counter initially is reset, that is, is storing all 0's, in response to a transition of SI from 1 to 0, A goes to 1 and B remains at 0. These inputs cause $Q_1$ to change from 0 to 1 so that the number ...001 is stored in the counter, where 1 is the least significant digit. It can be shown that for each following input pulse applied to terminal In, the least significant bit changes its value, that is, $Q_1$ changes its value and $2^0$ (which is equal to $Q_1$ during each phase 2 time) also changes its value.

Assume now that the counter is storing a count and that there is no 0- to- 1 transition at IN during the period T. In response to this condition, SI remains 1 and NOR gates 102 and 104 both remain disabled. Therefore, A and B are both 0. When the $\phi_2$ pulse occurs, PU1 and PD1 both conduct and the nodes NU1 and ND1 are charged to −V (binary 1). During phase 3 time, transistor U and D are both cut off so that nodes NU1 and ND1 remain charged to −V. The two inputs to circuit 106 of stage 1 are now both 1 and, as will be shown shortly, in response to this input, the circuit 106 remains in the same state. In other words, whatever the value of $Q_1$, that value remains for the complete clock pulse period T during which A and B remain equal to 0.

Assume now that the counter is still in the count-up phase and that it is storing a count of ...0111. (Note that in the drawing, the least significant bit is stored in the leftmost stage so that reading the drawing from left to right the same number will appear as 1110...The outputs $Q_1$, $Q_2$ and $Q_3$ (not shown) all have the value 1 and $\bar{Q}_1$, $\bar{Q}_2$and $\bar{Q}_3$ (not shown) all have the value 0. Assume now that there is a 0 to 1 transition at IN so that SI changes to 0. During phase 2 time, A changes to 1 and B remains at 0. The phase 2 pulse is applied to the gate and drain electrodes of transistor PU1 and the gate and drain electrodes of transistor PD1 so that nodes NU1 and ND1 become charged to −V. Similarly, via transistors PU2 and PD2 and PU3 (not shown) and PD3 (not shown) the nodes NU2, NU3, ND2 and ND3 all become charged to −V. Terminal 107 is also at −V so that the source and drain electrodes of transistor U are at the same potential and this transistor does not conduct.

During the next phase $\phi_3$ time, point 107 goes to ground. As $Q_1$, $Q_2$ and $Q_3$ (not shown) are all at 1, the transistors DU1, DU2 and DU3 (not shown) are all in the on state, that is, their source-to-drain paths exhibit a low impedance. Accordingly, conduction occurs from point NU3 through transistor DU2 to NU2, through transistor DU1, through transistor U, to terminal 107 which is at ground so that all three of these nodes NU1, NU2 and NU3 are placed at ground potential. NU4 (not shown) is also pulled up to ground via conducting transistor DU3 (not shown). In response to this condition, during the following $\phi_2$ time the circuit 106 of stages 1, 2 and 3 all change state so that the three least significant digits 111 change to 000. At this same time, the stage 4 circuit 106 (not shown) also changes state (its input is NU4=0; ND4=1) so that $Q_4$ changes to 1 and $\bar{Q}_4$ changes to 0. Therefore, the number stored in the counter has been changed from ...0111 to ...1000 and this change has occurred during one clock pulse period. As transistor D is off, the nodes ND1, ND2...NDN all remain charged to −V during the $\phi_3$ time.

The operation of the counter in the count-down mode of operation is quite analagous to that described above. In this mode of operation, CD is 0 and CU is 1. In response to a 0 to 1 transition at IN, SI changes to 0 and B becomes 1 and A remains 0. Thereafter, the circuit operates in the same way as described above; however, now the upper row assumes the role that the lower row previously did and vice versa. In this mode of operation, for example, if the number stored in the counter is ...1000=8 then in response to the next 0 to 1 transition at IN, the stored count changes to ...0111=7.

Figure 2:
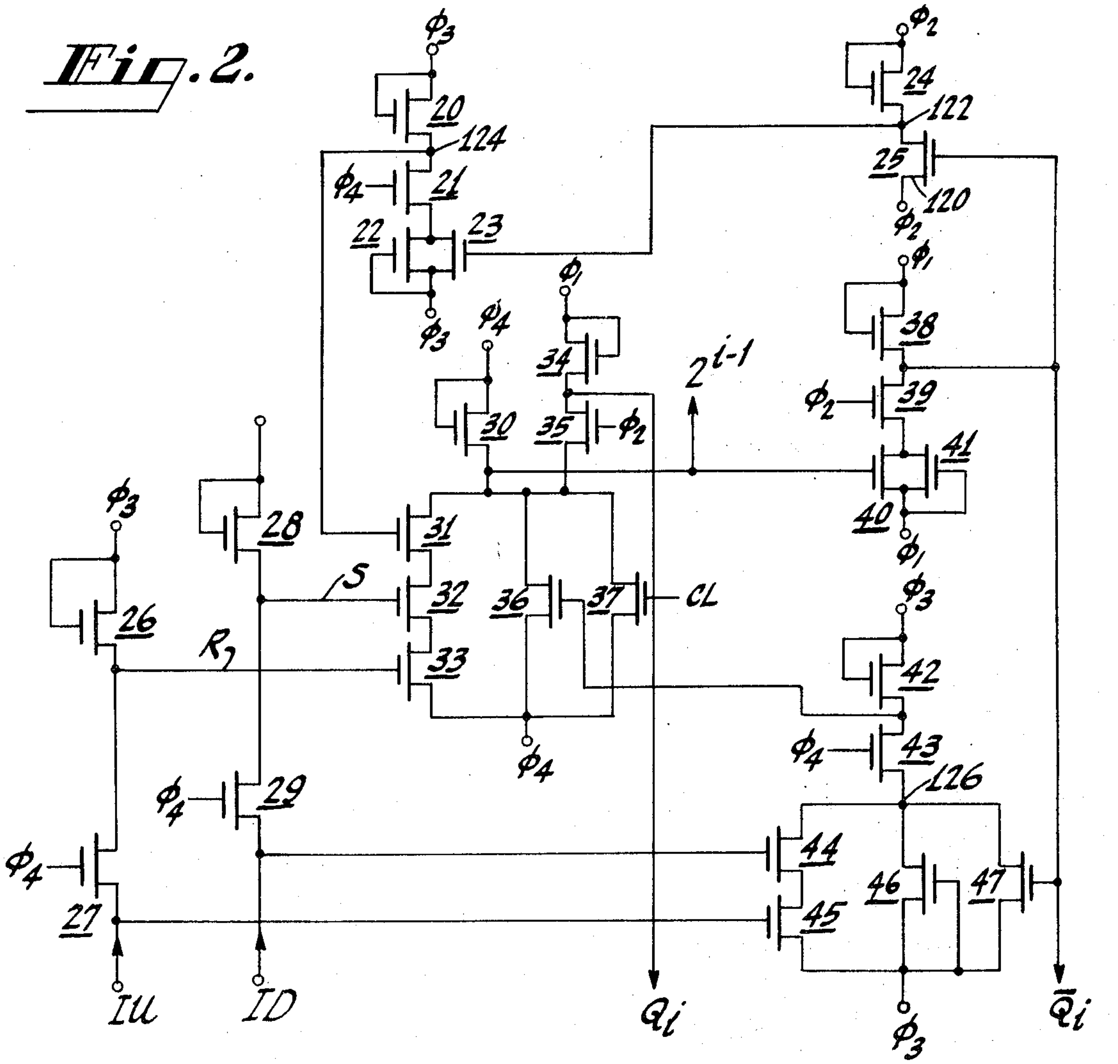
FIG. 2 is a schematic circuit diagram of a portion of the circuit shown in block form in FIG. 1.

A circuit diagram of the blocks 106 in FIG. 1 appears in FIG. 2. The circuit includes transistors 20, 21, 22...45, 46, 47, interconnected as shown. The transistors are all P-type MOS devices of the enhancement type and preferably are in the form of an integrated circuit. The operation of the circuit is succinctly given in FIG. 6; however, to help the reader several of the rows of the table will be discussed. In this table the initial conditions are that (a) counter is cleared, i.e., Q=0, $\bar{Q}$=1, and (b) no count pulse is present, hence, IU=1, ID=1.

Row 1 of the table indicated that transistor 25 is on. This is so because during $\phi_1$ time, transistor 38 conducts placing the gate electrode of transistor 25 at −V. The drain electrode 120 of transistor 25 is at ground during $\phi_1$ time. Node 122, to which the source electrode of transistor 25 is connected, was charged to −V during the previous $\phi_2$ time. Accordingly, transistor 25 conducts and node 122 goes to ground.

Transistor 31 conducts because node 124 is at −V. Transistors 32 and 33 conduct because S and R are at −V, having been placed there during the previous $\phi_3$ time. Transistor 34 is connected gate-to-drain so that in response to the pulse $\phi_1$ applied to this common connection it conducts. Transistors 38 and 41 are connected in similar fashion and this is the reason they conduct. As IU and ID are both at −V, transistors 44 and 45 are on. Transistor 47 conducts as $\bar{Q}_1$ is at −V and $\phi_3$ is at ground.

The first six lines of the table show that during each $\phi_1$ time, Q=1 and $\bar{Q}$=1. They also indicate that when IU=1, ID=1, there is no change in the output, that is, if the output initially is 0 (Q=0, $\bar{Q}$=1 ) the output remains at 0.

During phase 3 time (row 7 of the table), the input is changed, for purposes of this example, from IU=0, ID=1. In response to this input, the output of the counter changes from Q=0, $\bar{Q}$=1 to Q=1, $\bar{Q}$=0 (row 10 of the table).

A count down by 1 operation is illustrated in rows 11 through 14 of the table. At phase 3 time (row 11), the input to the counter circuit of FIG. 2 is changed to 10. In response thereto, during the following phase 2 time (row 14) the counter output changes from 10 to 01.

While all of the possible conditions of the FIG. 2 circuit are not illustrated in the table, it readily can be shown that whatever the count (0 to 1) stored in the FIG. 2 circuit during one clock period T, if the input to the counter circuit is 01 for the following clock period, the stored count will be changed in value. Similarly, regardless of the count stored during one clock period T, if the input to the counter circuit is at 10 for the following clock period, the stored count will be changed in value.

As should be clear from the discussion above, a counter input 00 is not permitted and never occurs in this particular circuit. It cannot occur because two corresponding nodes such as NU1 and ND1 cannot both be discharged (cannot both be at ground) at the same time. Note that the only conditions possible for A and B are A=B=0;A=1, B=0; and A=0, B=1. This means that transistors D and U can never both be "on" at the same time so that one of NU1 and ND1 must always be charged to −V (must always be a 1).

Figure 4:
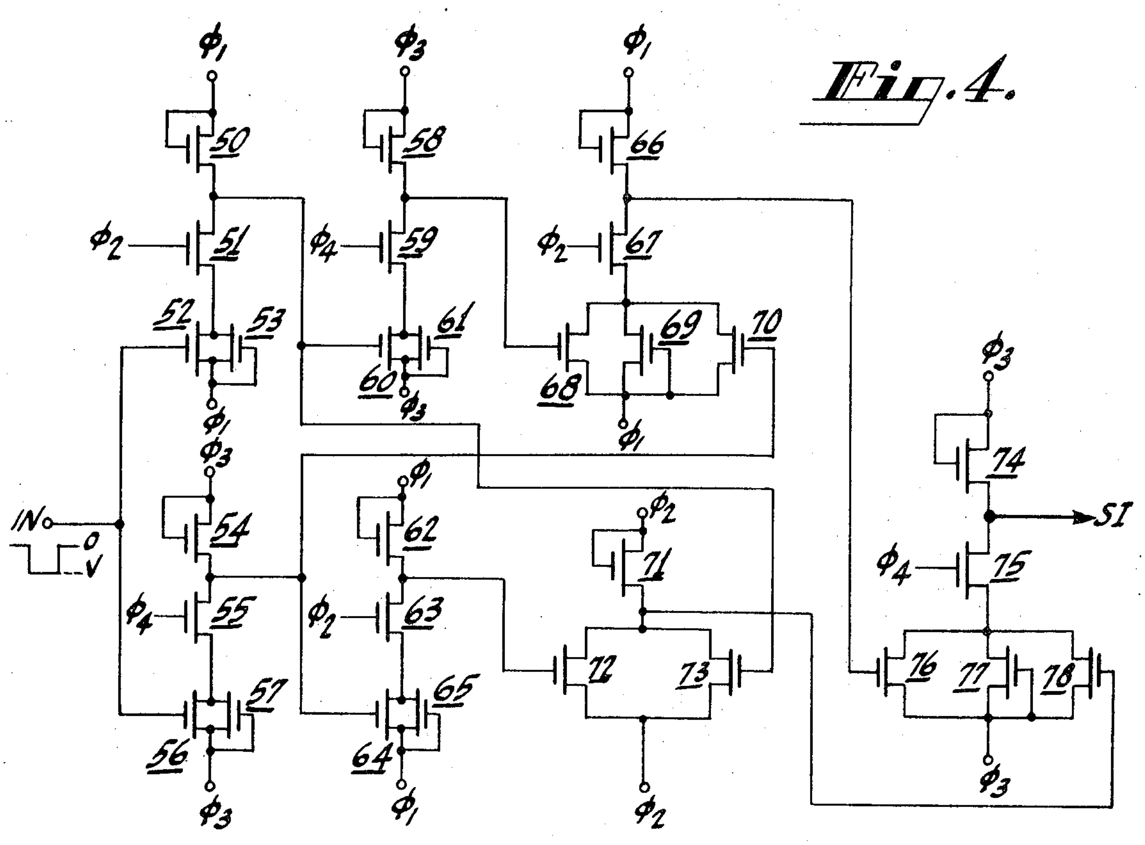
FIG. 4 is a schematic circuit diagram of another portion of the circuit of FIG. 1.

FIG. 4 illustrates the circuit 100 of FIG. 1. The circuit includes transistors 50, 51, ...76, 77, 78 interconnected as shown. The operation of the circuit is succinctly given in the table of FIG. 7. To aid the reader to trace this operation, a number of the rows in the table are discussed below.

The chart shows how an input (IN) of any width, occurring at any moment during a clock period, is always converted into a pulse that is never less than three-quarters of a period wide at the output (SI).

The symbols and conventions used in this chart are equivalent to those of the chart in FIG. 6. So, this chart will not be discussed row by row.

The first four rows indicate that the input (IN) continues to remain 0. In the fifth and sixth row, the input goes to 1, indicating that an input pulse occurs during $\phi_1$ and remains there for a duration of half a period. As a consequence, the output SI goes to 0 in the eighth, ninth and 10th rows. Note that the output SI can be used during $\phi_1$ and $\phi_2$.

Rows 11, 12, 13, 14, 15 and 16 show the occurrence of another input pulse. This pulse occurs during $\phi_3$ and lasts for 1 ½periods. Consequently, the output SI goes to 0 in rows 16, 17, and 18. Note that the output is again not more than one period wide and is again usable during $\phi_1$ and $\phi_2$.

Thus, circuit 100 synchronizes asynchronous pulses of arbitrary duration so that they can be used by the counter.

Figure 5:
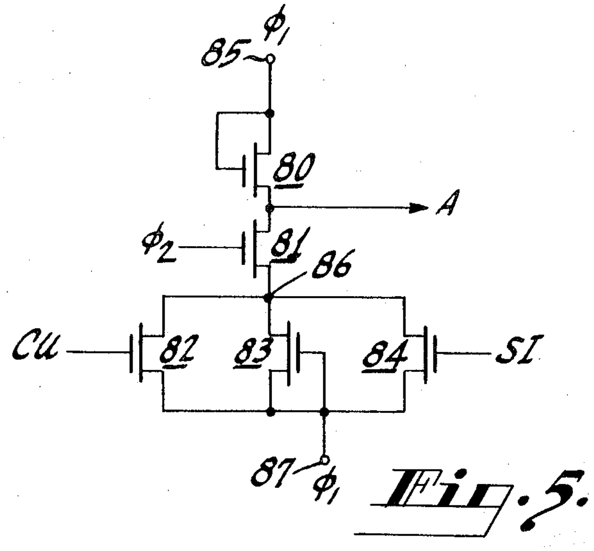
FIG. 5 is a schematic circuit diagram of a NOR gate such as shown in FIG. 1.

FIG. 5 illustrates the circuit of a NOR gate such as 102 of FIG. 1. The circuit includes the conduction paths of two transistors 80 and 81 connected in series between terminal 85 and circuit node 86 and the conduction paths of three transistors 82, 83 and 84 connected in parallel between circuit node 86 and terminal 87.

In the operation of the circuit of FIG. 5, during $_1$ time transistors 80 and 83 conduct, charging circuit nodes A and 86 to −V. During $\phi_2$ time, transistor 81 is turned on. If during the same interval CU=1 (−V) or SI=1, then either transistor 82 or 84 is turned on. In either case, a low impedance path (transistor 81 is on and at least one of transistors 82 and 84 is on) will exist between node A and terminal 87 and as the latter is at ground during $\phi_2$ time, node A will be pulled up to ground potential. If, on the other hand, both DU and SI are 0 (are at ground potential) during $\phi_2$ time, then transistors 82 and 84 are cut off. Transistor 83 is also cut off since terminal 87 is at ground during $\phi_2$ time. Accordingly, even though transistor 81 is on, there is no path from node A to ground and this node remains at −V, that is, A=1. It should be clear from FIG. 5 that A retains the value 1 until at least the nest $\phi_2$ time because the $\phi_3$ and $\phi_4$ pulses are not applied to the NOR gate of FIG. 5 and cannot discharge the charge stored in the distributed capacitance present between node A and ground.

A typical operating speed for a four-phase circuit is 2 megahertz (MHz). The counter of FIG. 1 may be operated at this speed, that is, at 2 megabits per second. This speed is a relatively high one for MOS circuits and because the device count is relatively low, 20 stages of the counter can be put on a single integrated circuit chip.

It should be clear from the discussion above that the counter of the present invention operates as a parallel counter in the sense that all stages change state concurrently. However, in a conventional $n$ bit parallel counter aside from the basic counter stages there are $$\frac{(N-1)\ (N-2)}{2}$$

swithches (i.e., one 1-input NOR gate between stages 1 and 2, one, 2-input NOR GATE (requires two switches) between stages 2 and 3, and so on). In the present circuit, however, only (N −1) switches are used, one between each pair of stages. This is a considerable saving when N is large, and N is large in large scale integration (LSI) circuits.

What is claimed is:

1. A counter comprising, in combination:

a plurality of stages, each for storing a binary digit of different rank, each such stage having an input terminal to which a first voltage level may be applied for changing the state of that stage and to which a second voltage level may be applied for maintaining that stage in the same state and each such stage having an output terminal;

a plurality of switches, one for each stage except the last stage, each switch connected between the input terminal of its stage and the input terminal of the following stage;

means at each stage except the last stage for closing the switch of that stage in response to the storage there of a bit of one value and for opening the switch of that stage in response to the storage there of a bit of other value;

a plurality of storage means, one per input terminal, each connected between its input terminal and a point at said first voltage level;

means coupled to all of said storage means for concurrently charging them to said second voltage level during a first interval of time; and means responsive to a counter input signal for connecting, during a following interval of time, the input terminal of the one of said stages storing the binary digit of least significance to a circuit point at said first voltage level.

2. A counter set forth in claim 1 wherein each switch comprises a field-effect device the conduction path of which is connected between a pair of said input terminals and the gate electrode of which is connected to one of said output terminals.

3. A counter as set forth in claim 2 wherein said counter is an integrated circuit on a common substrate and wherein each storage means comprises a distributed capacitance to said substrate.

4. In the counter of the type in which, when more than one stage is required to change state, said more than one stages change state concurrently, in combination:

N stages, where N is an integer substantially greater than 1 and is equal to the number of bits the counter is capable of storing, each such stage having an input terminal and an output terminal; and N−1 switches, one for each stage except the Nth stage, each switch having a control element and a path between two terminals whose impedance is controlled solely by said control element, the switch for each $j$th stage connected at its control element to the output terminal of the $j$th stage and responsive to the bit stored therein, connected at one switch terminal to the input terminal of the $j$th stage, and connected at its other switch terminal to the input terminal to the $j$+1th stage, where $j$=1, 2, ...(N − 1).

5. In a counter as set forth in claim 4, each switch comprising a field-effect transistor having a gate electrode comprising said control element and having a conduction path at the opposite ends of which said two switch terminals are respectively located.

* * * * *